July 21, 1931. H. DRUART 1,815,668
ROTARY MACHINE FOR CONTINUOUSLY MAKING COMPRESSED
SLABS OR FLOOR TILES WITH COLORED DESIGNS
Filed Aug. 24, 1929 8 Sheets-Sheet 1

Inventor:
Henri Druart.
Attorney:

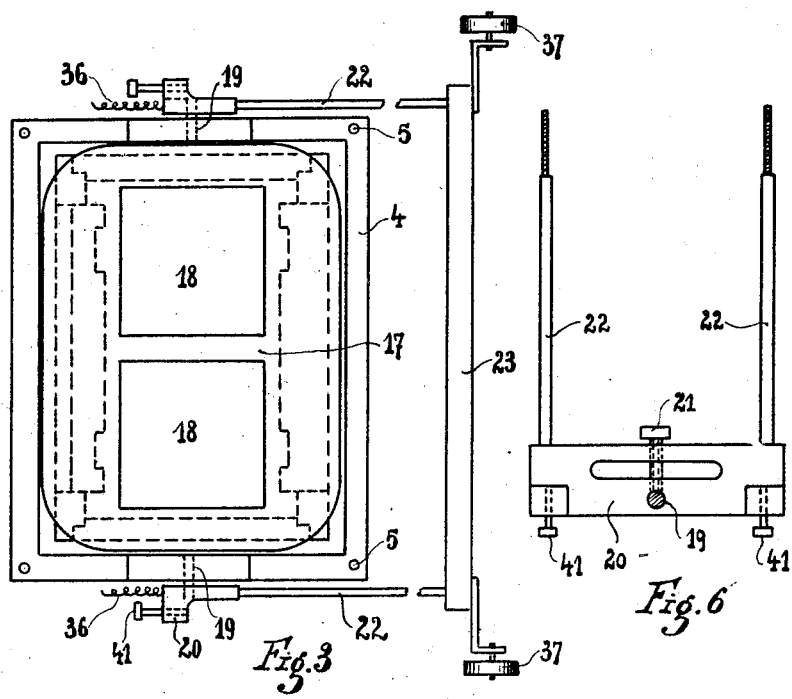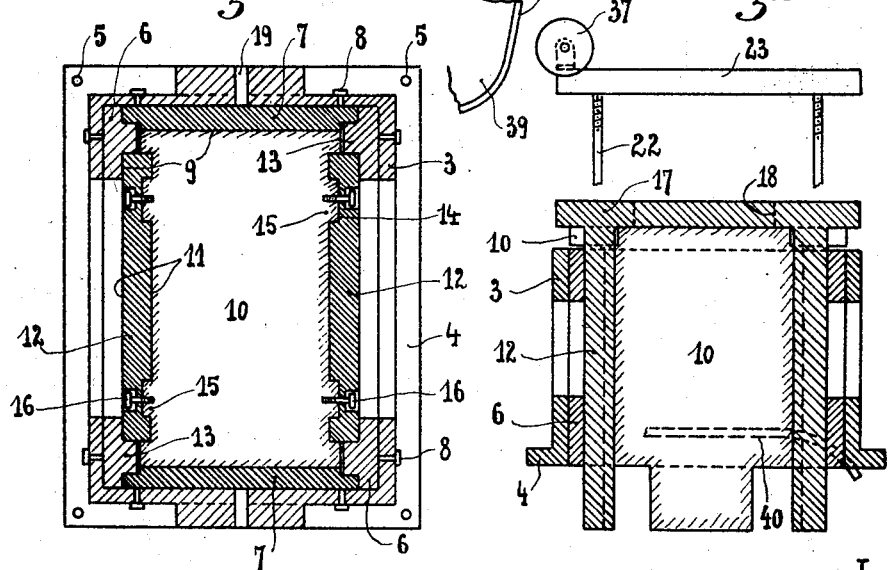

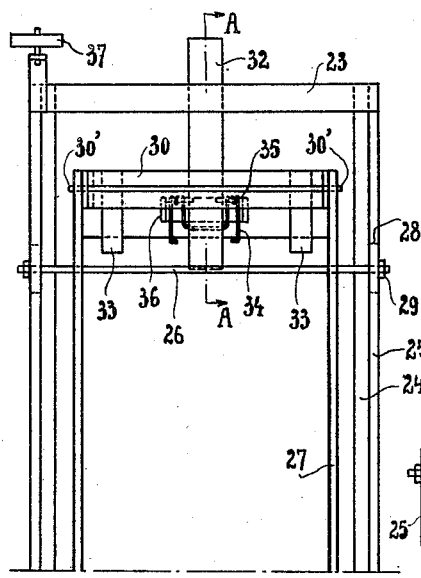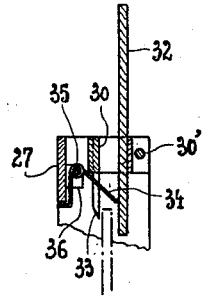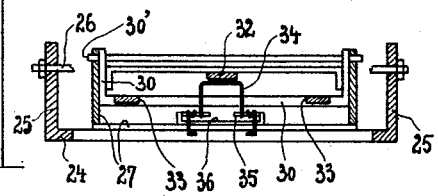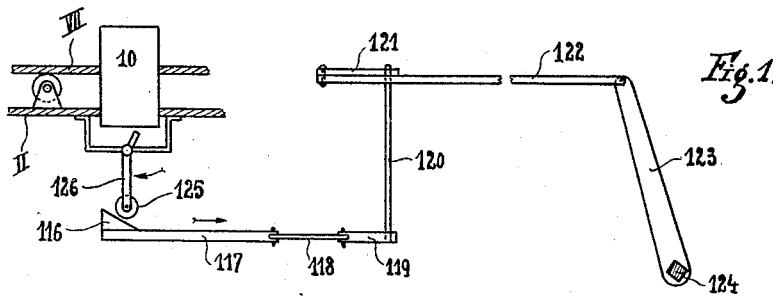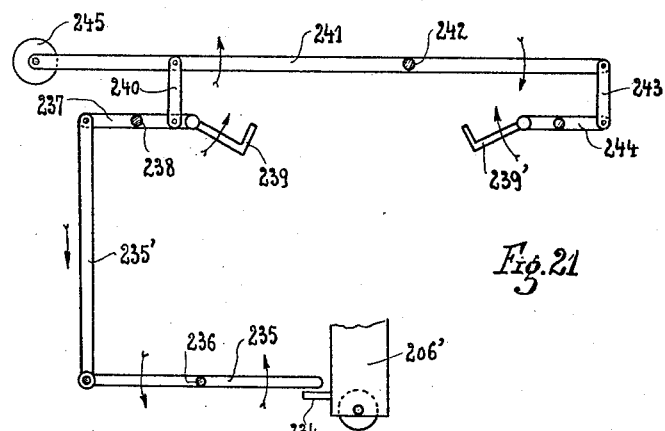

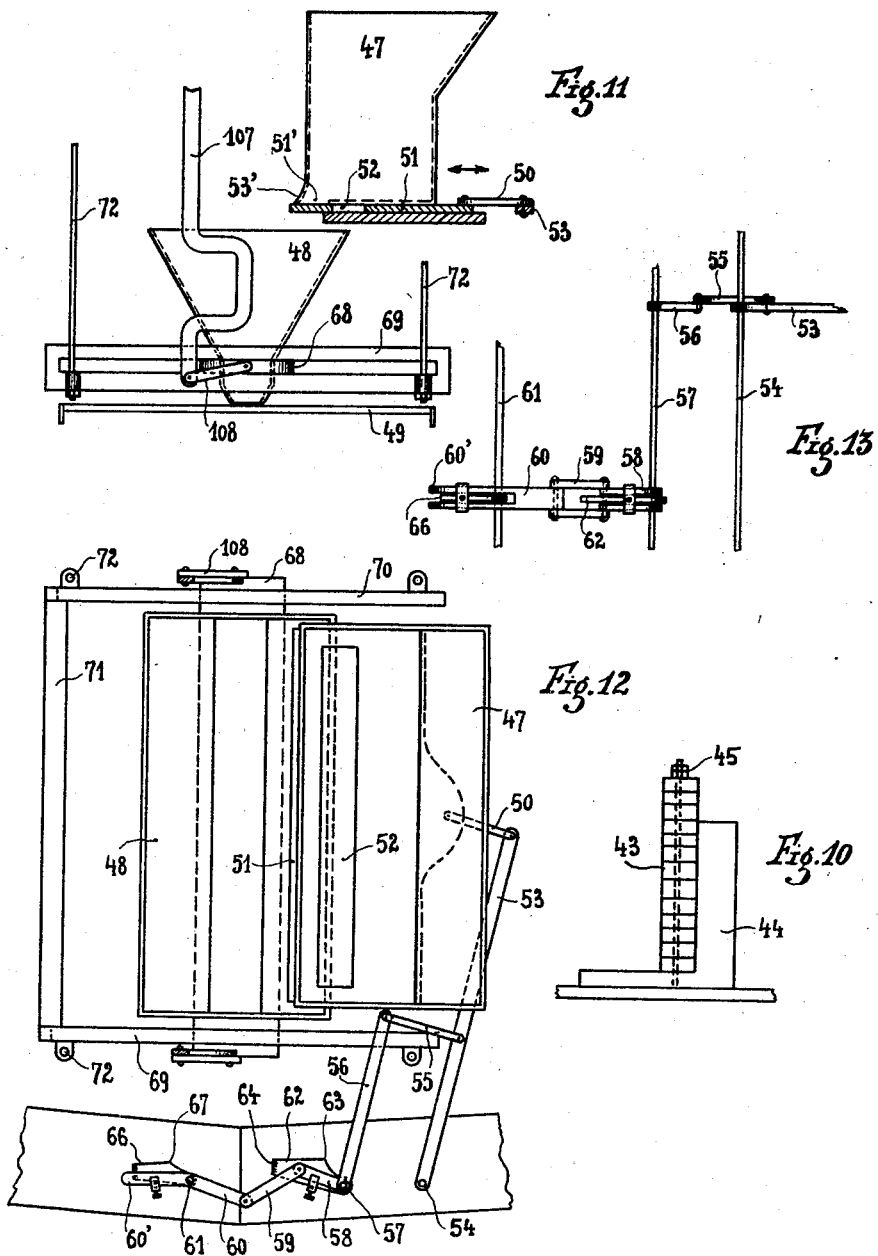

Inventor:
Henri Druart.
Attorney:

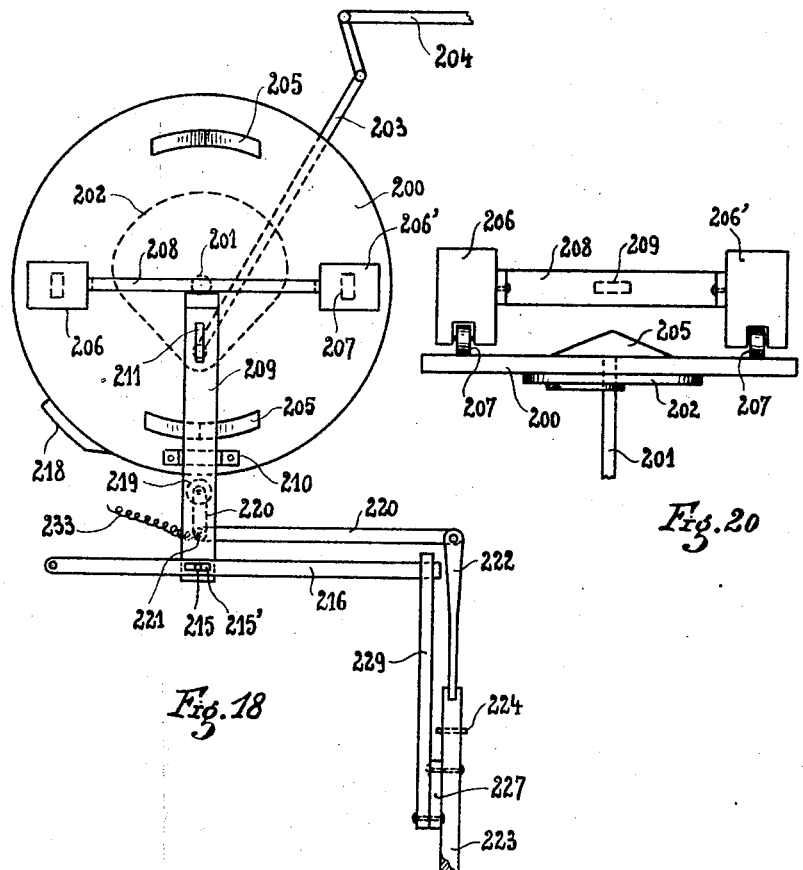
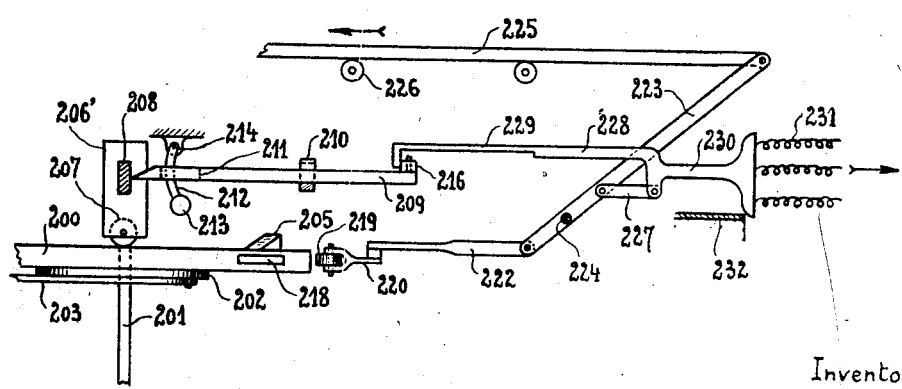

July 21, 1931.                    H. DRUART                        1,815,668
        ROTARY MACHINE FOR CONTINUOUSLY MAKING COMPRESSED
            SLABS OR FLOOR TILES WITH COLORED DESIGNS
                  Filed Aug. 24, 1929        8 Sheets-Sheet 7

Inventor:
Henri Druart.
Attorney:

Inventor:
Henri Druart.
Attorney:

Patented July 21, 1931

1,815,668

UNITED STATES PATENT OFFICE

HENRI DRUART, OF LOMME, FRANCE

ROTARY MACHINE FOR CONTINUOUSLY MAKING COMPRESSED SLABS OR FLOOR TILES WITH COLORED DESIGNS

Application filed August 24, 1929, Serial No. 388,210, and in Belgium July 12, 1929.

This present invention has for its object to provide a rotary machine for continuously making compressed slabs or floor-tiles with colored designs.

The primary object of the invention is to provide a machine of this type wherein the following operations will be effected automatically and continuously without any stopping: feeding and distributing the selected colours according to any design, filling the moulds with the material to be compressed, compressing and removing same from the moulds. Said operations are connected together by other operations such as: sifting, removing and inserting metal patterns and the like.

Broadly stated the machine comprises a lower annular table, adapted to be rotated in the stationary frame and supporting a number of moulds uniformly distributed. A periodical rotary movement will be imparted to said table, each period of such movement corresponding to a displacement equal to the angle formed between two radii passing through the centres of two successive moulds. Arranged above said table are feeding devices spaced at distances equal to those between the moulds. Said feeding devices are operated on one hand by the lower table and on the other hand by a second upper annular table, to which the same periodical movement as well as another opposite movement of equal amplitude will be imparted for the purpose hereinafter described.

Assuming an individual mould which is empty after the discharge of the finished article and cleaning, the successive operations to which said mould will be submitted, are the following: To the mould with its lower table and upper table a movement will be imparted, the amplitude of which depends on the total number of moulds; the lower table and mould being stopped, the upper table will be moved backwardly to the amount to which it has been moved forwardly and during this backward movement said upper table will supply the other moulds with colours, as hereinafter described but it does not at all influence the mould considered; during the movement of the lower table, a suitable carrier has placed above the mould and parallel to same the pattern or design (for the colours) and a member operated by the movement of the lower table will disengage said pattern which is received into the mould. The upper table having been moved back to its initial position, both tables will again be moved in unison with the result that the pattern carrier will be moved away from the mould and at the end of said movement the mould will become below the first colour delivering device. At the end of said movement the lower table has actuated a slide which supplies said delivering device with a desired adjustable amount of colour. The lower table being locked, the upper table will be moved backwardly; when starting such backward movement, the upper table will cause the downward movement, upon the design of the mould, of said delivering device and a counter-pattern carried by same, whereby the portions of the design to be supplied with colours will remain uncovered; upon its backward movement the upper table will impart a reciprocating movement to the delivering device on the counter-pattern for the purpose of perfectly distributing the colour; at the end of the backward movement of the table the counter-pattern together with the delivering device will be raised. Both tables will be moved again simultaneously to bring the mould to a second delivering device, identical with the first one, then to a third, fourth etc. delivering device. Thus the mould in question will successively pass below the various delivering devices, the pattern-carrier remaining always spaced from the mould. After the last delivering device the pattern-carrier will be brought back above the mould and owing to the movement of the lower table the pattern will be moved back into the pattern-carrier which will again be spaced from the mould. Upon the next movement of the lower table the mould will be brought below a clay (or other material to be compressed to form the body of the floor-tile) delivering device; upon its backward movement the upper table will act said delivering device for filling the mould, whereupon owing to another movement of both tables another distribution of finishing material will be effected. After all the constituents of the floor-tile or slab have been distributed into the mould, the latter upon a further movement of the tables will be moved below a compressing mechanism acting from below to compress the materials against a fixed part, whereupon a last movement will be imparted to the tables to remove the compressed material from the mould, clean the latter and come back to the initial position.

It will be seen that to each angular movement of the lower table a removal of article from a mould will correspond so that if the table has 24 double moulds, a production of 48 finished slabs or tiles will correspond to each revolution of the machine.

The machine will now be described in detail with reference to the accompanying drawings, wherein:

Fig. 3 is a plan view of a mould.

Fig. 4 is a corresponding horizontal section;

Fig. 5 is a vertical section with the pattern-carrier in a position different from that of Fig. 3.

Fig. 6 is the front elevation of the bracket of the pattern-carrier.

Figs. 7 and 8 show details of the pattern-carrier mechanism.

Fig. 9 is a fragmentary section on line A—A of Fig. 7, showing the pattern-carrier in place;

Fig. 10 is an elevation showing the gauges carried by the lower table.

Fig. 11 is an end view showing details of the colour delivering hoppers.

Fig. 12 is a plan view of Fig. 11 with details of the operating levers actuated by the lower table.

Fig. 13 is an elevation of the operating levers.

Fig. 17 is a view of the mechanism for removing the pattern from the mould.

Figs. 18 to 20 are different views of the mechanism for removing the articles from the moulds after compression.

Fig. 21 shows the mechanism for bringing the pattern back into the mould after the removal of the article.

Broadly stated the machine comprises the following main parts: a circular stationary frame, two superimposed circular tables adapted to be rotated in the frame, a series of moulds (24 in the example) mounted radially and symmetrically on the lower table, a series of colour delivering devices (20) supported by the frame exactly at the same spacings as the moulds and above the latter, a press for compressing the slabs or tiles, eventually another press connected to the former for operating the tables and delivering devices, a mechanism for removing the articles from the moulds, and various safety and operating mechanisms for certain parts or members.

In the following disclosure the term "big press" means the press for compressing the slabs or tiles and the term "little press" means the press for controlling the movements of the tables.

Figure 1:
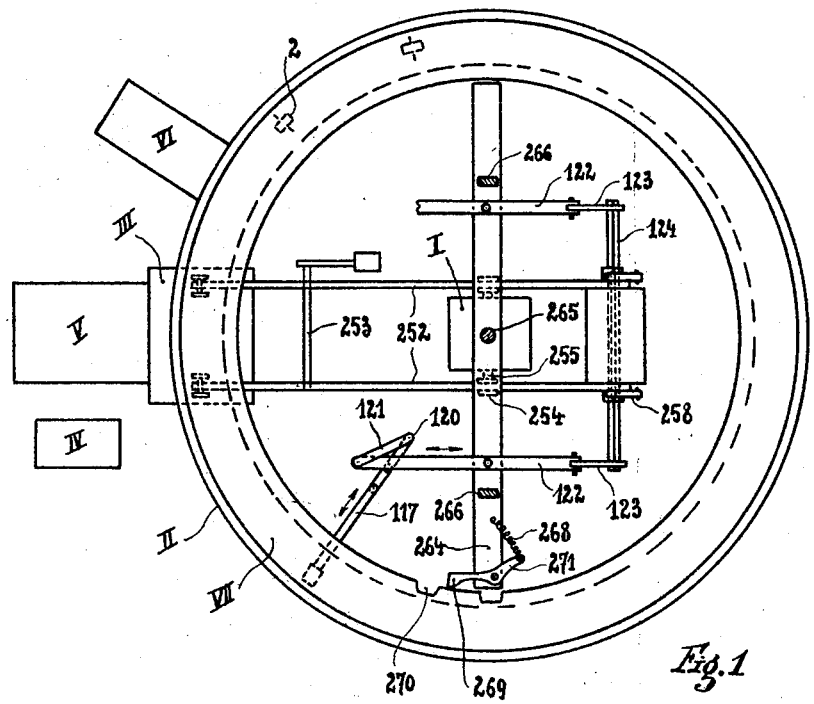
Fig. 1 is a general plan view with the moulds and colour delivering devices removed.
Figure 2:
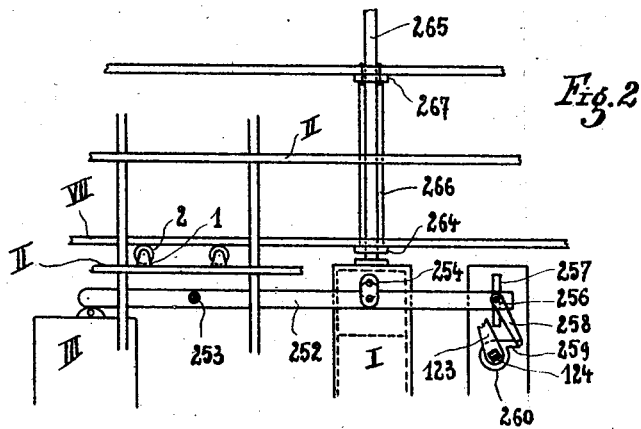
Fig. 2 is a fragmentary elevation showing the respective positions of the tables and frame.

Owing to the complicated construction of the machine and the size thereof, it is not possible to give a complete general view of same; Figs. 1 and 2 are diagrammatic views only, showing the relative positions of the main parts, each of which is described and shown in detail in other views.

Referring to Fig. 1, I designates the little press mounted at the centre of the circular frame II supporting the rotary tables and delivering devices. III is the big press mounted at any desired place of the frame in such a way that the piston thereof is in a plane parallel to the lower table and extends radially to the latter. IV is the auxiliary engine of the machine, V the pressure distributor to the presses and VI the mechanism for removing the articles from the moulds and making the empty moulds ready for new operations.

Referring to Fig. 2 the frame II is shown in elevation and supporting rollers 2 in bearings 1, the lower table VII being moved on said rollers.

The machine comprises twenty-four moulds symmetrically arranged on the entire circumference of the annular table VII, said moulds may be single moulds but preferably they are double (for two slabs or tiles) and mounted radially with relation to the table VII. As all the moulds are similar, it will be sufficient to describe one of them (Figs. 3 to 5).

Each mould comprises a rectangular box 3, rigidly secured on the table VII by means of its lower flanges 4 and bolts 5. The long sides of said box are provided internally with guide-plates 6, whilst the ends of the box have guide-plates 7. Each of said plates is adjustable with relation to the wall by means of bolts 8 extending through the latter. As shown in Fig. 4 the two guides by their projecting portions 9 confine the housing for the pedestal 10 extending through the bottom wall of the box and the table VII and the upper flanges of which rest on the top face of the guides. Said pedestal is designed to receive the pressure of the big press acting from below as hereinafter described. The pedestal does not extend over the entire width of the box, but on either side there remains a space 11 for the housing of a post 12 extending downwardly through the table VII and upwardly above the box 3. Said posts are guided by the guide-plates 6 (ribs 13, Fig. 4) and grooves 14 engaged by ribs 15 on the sides of the pedestal. Bolts 16 extending through slots in the posts serve to adjust the parts. The upper ends of the posts support the plate 17 parallel to the top face of the pedestal and in which two apertures 18 constituting the moulds are formed. Normally for the filling and compression the plate 17 is firmly supported on the pedestal which in this way forms the bottom wall of the mould, but said parts may be moved individually at the desired moment.

Said mould is designed to receive the metallic pattern into which the colours are to be poured successively. Said pattern is placed into the mould after the latter has been cleaned, but it must be removed therefrom if after the introduction of all the colours, the materials to be compressed are to be introduced into the mould. Therefore the invention has provided a pattern operating mechanism (Figs. 3, 5 to 9).

Each pattern is carried by or made integral with a projecting frame adapted to be grasped and held in fixed position by a mechanism presently described. Each mould box has two journals 19 extending in the direction of the long axis thereof and projecting externally. Pivotally mounted on each journal is a bracket, the shape of which is shown in Figs. 3 and 6. 21 is a lubricator. Each bracket has two long parallel arms 22, each ending into a threaded portion for the adjustable fastening of a metallic frame 23 supported on the four arms of the two brackets 20. Said frame is the pattern-carrier. In practice the same has two positions only: During the major part of a complete revolution of the machine the pattern carrier is turned down (Fig. 3) upon the side of mould box; in the other position, the brackets 20 having been pivoted to 90°, the pattern-carrier is in a horizontal plane above the mould plate in such a position that the pattern carried thereby will be exactly superimposed to the apertures of the mould (Fig. 5).

Said frame (Figs. 7 and 8) is formed of metal blades 24 assembled in a rectangular shape, the long sides of which are provided with blades 25 at their edges. The blades 25 together with rods 26 support a second frame 27, the position of which in the frame 23 is exactly adjustable in the horizontal plane by means of slots 28 in the blades 25 and locking nuts 29 screwed onto the rods 26. The two short sides of the frame 27 support a horizontal bar 30 pivotally mounted on end journals 30'. Said bar 30 is made integral with a rod 32 hereinafter termed "trigger", extending inwardly into said frame and outwardly beyond the frame 23. Said bar 30 moreover carries two locking bolts 33 having bevelled edges and normally projecting some distance into the frame.

The inner part of the rod 32 is urged upwardly by two springs 34, surrounding the short axle 35 on the bracket 36 attached to the short side of the frame 27. At one end said springs bear against the inner face of the frame 27 and at the other end below the inner end of the trigger. The upward movement of the rod 32 is limited by the outer end thereof engaging the main frame 23. It will be understood that, the entire frame being held fixedly in the outward position of the four locking bolts, if from below the projecting part of the pattern-carrier presses against said bolts, the latter owing to their bevelled edges will be disengaged against the action of the springs 34 until the pattern carrier has been moved beyond said locking bolts, which urged by the springs 34 will be engaged again to support said pattern-carrier, secured above by the inner ends of the triggers. Thus the pattern will be firmly held in the frame 23, 27 and automatically disengaged therefrom by gravity upon the operation of the triggers.

Coil springs 36' attached to the table VII and brackets 20 (Fig. 3) have tendency to hold the pattern carrying frame in a horizontal plane (position shown in Fig. 5); the turning down of said frame to the position shown in Fig. 3 is produced by the rollers 37 carried by the frame, engaging the upwardly curved portions 38 of two horizontal rails 39 extending substantially around the whole circumference of the table VII. Said rails are supported on the frame and cause the frames to be held in their turned down positions until the springs 36' will be caused to act at the ends of said rails. The raising is started by inclined fixed guides 40, on which the brackets will slide to be progressively raised (Fig. 5).

Fig. 3 shows the brackets provided at their lower portions with vertically adjustable screws 41 for the purpose of securing sufficient engagement with the guides 40. Preferably the frames 23, on the sides engaging the table VII upon being turned down, have buffer springs (not shown).

As already mentioned, the pattern having been inserted into the mould and the frame 23 turned down, the machine will introduce the colours. Such introduction is effected automatically and exactly and the operating mechanism is such that not only slabs or tiles with multi-colored designs, but also slabs or tiles with different designs and colourings may be produced simultaneously. Generally stated the colour delivering mechanism comprises for each mould a series of gauges carried by the table in front of the mould. In the example shown, the machine having twenty-four moulds, seven of which are operated for compressing, removing the articles from the moulds, cleaning and introducing the material to be compressed, there remain seventeen places each of which may serve to deliver a colour. Therefore in this case seventeen different colours may be delivered simultaneously or a smaller number with a plurality of designs.

The seventeen delivering devices supported on the frame above the moulds, have each a counter-pattern corresponding to the portions of the design to be filled with colour from said devices. If for a slab or tile considered the colours and counter-patterns of the third, the ninth and twelfth delivering devices should be used for instance, the corresponding gauges of the mould forming said slab or tile will be adjusted as hereinafter described, each mould having a number of gauges equal to the number of colour distributing devices. For instance said gauges are superimposed metal blades 43 (Fig. 10), supported on a rigid bracket 44 secured to the table VII in front of each mould. At the same place all the blades have a hole engaged by the rod 45 of the bracket provided with screw-threads at the top. Said blades extend radially, substantially to the outer rim of the table VII. For the purpose of adjusting the delivery, the gauges Nos. 3, 9 and 12 (in the example) remain in the diametrical direction, whilst all the others are moved to 90°, whereupon the nut on the rod 45 will be tightened to firmly hold the whole. In these circumstances the gauges Nos. 3, 9 and 12 only are adapted to engage the lugs—hereinafter described—on the delivering mechanism proper.

Each of the delivering devices (Figs. 11 to 16) is supported on the frame of the machine and comprises a hopper 47 containing the colour. Said hopper is arranged above a movable hopper 48 which in turn is arranged above a counter-pattern 49. The hopper 47 is open at the bottom of the front at 51' and similarly to the hopper 48 it extends over the entire width of the mould plate. The feeding from 47 to 48 is effected by means of a slide 51 movable on the bottom of the hopper 47 in the direction of the arrow (Fig. 11) and having a port 52. The colour comprised in said port 52 will be pushed towards the opening 57' and drops into the hopper 48 in amounts depending on the amplitude of movement of the slide, a small incline 53' secures the dropping of the colour into the hopper 48.

The slide 51 (Figs. 11 to 13) has an arm 50 pivotally connected to a lever 53 pivotally arranged at 54. Pivotally connected to the lever 53 is an arm 55, which in turn is pivotally connected to another arm 56 fast on the vertical shaft 57. Fast on the lower part at the level of the table VII of said shaft 57 is an arm 58 pivotally connected to an arm 59 which in turn is pivotally connected to a two-armed lever 60—60' fulcrumed at 61. The arm 58 is formed of two superimposed blades, between which a lug 62 is arranged, said lug being pivotally arranged on the shaft 57 and having its nose 63 projecting from said blades 58. The face end of said lug 62 is provided with a scale 64 and after adjustment it may be locked by means of a locking screw. The arm 60' of the lever 60—60' is similarly formed of two superimposed blades, holding a part 66 firmly between them, said part having a projecting nose 67. The arms 60', 60 and 59 are made of equal length. The scale 64 indicates the amount of colour delivered to 48 by the slide 51. After 62 has been adjusted as desired it will be seen that as the table VII is rotated in clockwise direction, if for instance the delivering device considered is No. 3, the third gauge of the mould will first engage the nose 63 located in its plane; whereby the slide is caused to move towards the opening 51' to deliver a certain amount of colour to 48: at the same time the nose 67 has been moved into the path of the third gauge and thus caused to turn to an extent equal to its displacement (equality of the arms 60' 60, 59), whereby the slide will be moved backwardly.

The colour having been received into the hopper 48, it is to be brought into the design and mould.

The hopper 48 is carried by a frame 68 arranged and guided by its small ends between two rails or cross bars 69—70, which in turn are carried by a frame 71 to which the counter-pattern 49 is attached by any suitable means. Therefore the connection will secure on one hand independency of the hopper 48 with relation to the counter-pattern in its longitudinal reciprocating movements, and on the other hand, connection between the counter-pattern and hopper 48 in the vertical movements.

The first movement consists in lowering the counter-pattern together with the hopper 48. It will be exactly placed upon the mould plate. The frame 71 is rigidly suspended from four vertical rods 72 (Fig. 14) connected by means of nuts 73 to two horizontal parallel bars 74 each of which having with adjusting slots 75 a yoke 76 provided with a knob connected by means of a rod to another knob 77' integral with a cam 78. The axle of each cam is supported on a small bracket 79 attached to a part of the frame not shown for sake of clearness of the drawings.

One of the knobs 77' is at the right of the axle of its cam, whilst the other is at the left of its cam. Each cam has a second knob 81 diametrically opposite to the knob 77' and actuated by a sliding block 82 (Figs. 14, 15) guided parallel to itself on a part of the machine frame (guides 80). The two sliding blocks are pivotally connected to the ends of a balance beam 83 fulcrumed at the centre 84 and one arm of which is provided with a knob 85 to which a short arm 86 is pivotally connected, one end of said arm having a roller 87 whilst the other has a pin engaging a slot 88 in a long arm 89. Said arm 89, the length of which may be adjustable, is formed of a rod fitted into a sleeve 90, a spring 91 being wound around said rod and bearing on one hand on the ring 92 on said rod, and on the other hand on the end of said sleeve. A projection 93 on said rod engages a slot 94 in the sleeve and prevents the rod from being disengaged therefrom. Said sleeve is pivotally connected to one end of a two-armed lever 95 the other end of which is under the action of a spring 113. The arm 89 is located in the plane of the upper table 96 and the two-armed lever 95 is secured on a vertical shaft 97 extending through the machine frame and carrying, at the level of the table VII, in the path of the gauges, a nose 98 engaged by said gauges after the noses 63 and 66.

The upper table is formed of an angle-iron 96, the short arm of which, in the example, has twenty-four notches 99 (Fig. 15) with bevelled rims, spaced by smooth circular parts. The long arm of said angle iron on the other side between the notches has lugs 100 arranged in staggered relation to a horizontal plane located midway the height of said arm.

Figure 14:
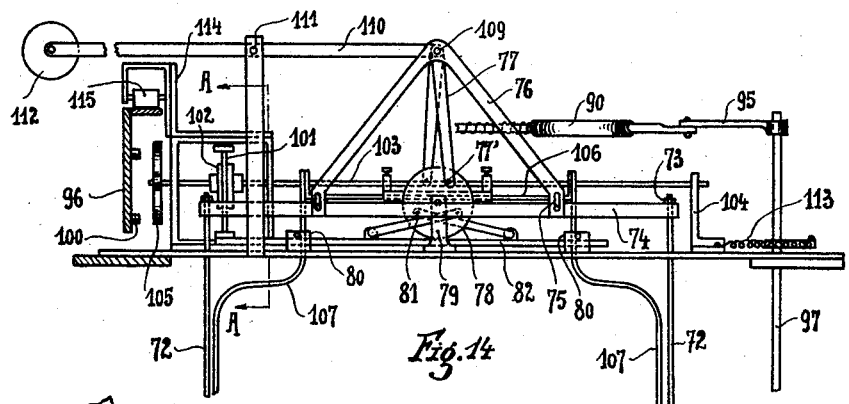
Figs. 14 and 15 show an elevation and plan view respectively of the operating mechanism of the colour delivery actuated by both tables.

On the other hand the balance-beam 83 has a vertical pin 101 engaged between two discs 102 fast on a rotary shaft 103 freely supported in bearings 104. On its inner end said shaft, extending parallel to the bars 74, carries a piece 103 (Fig. 16) secured thereon and made substantially of the shape of an anchor. Keyed on said shaft by means of a screw for rotation only is a bridge 105 from which two connecting rods 107 extend, said rods 107 being curved as shown in Figs. 11 and 14. Each of the connecting rods is pivotally connected to a short arm 108 and each arm 108 is pivotally connected to one end of the frame 68 supporting the hopper 48. The two yokes 76 may be connected together by a cross piece 109 and suspended from the ends of arms 110 pivoted at 111 and carrying balance weights 112. Other details of construction, such as antifriction rollers 115 for the upper table, protecting casing 114, are shown, but these details do not affect the comprehensibility of the operation.

Figure 15:
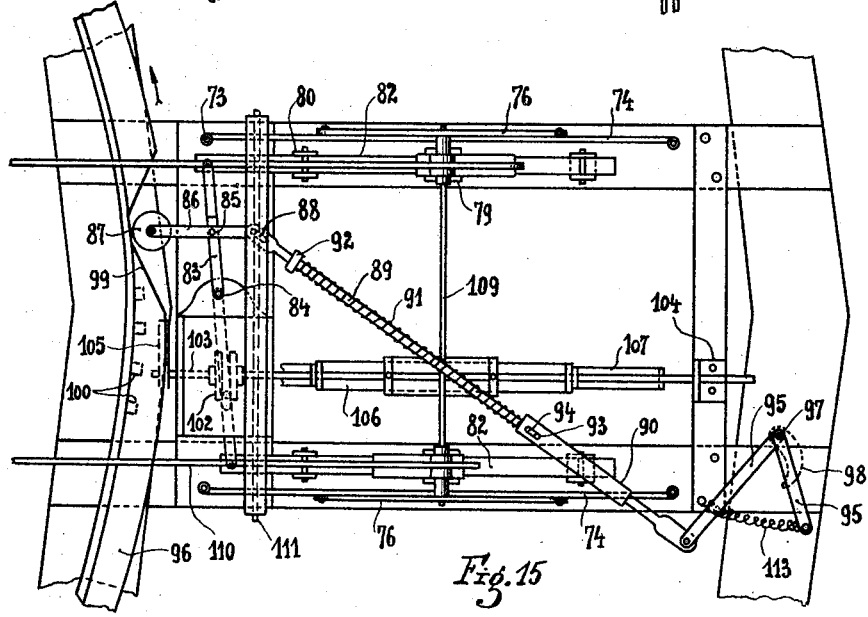
Figure 16:
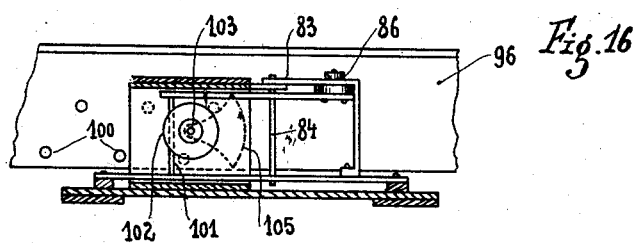
Fig. 16 is a section on line A—A of Fig. 14.

In the position shown in Fig. 15, the two tables are stopped, the nose 98 being held pushed back by the gauge; therefore the roller 87 has been forced into a notch 99 in the table 96. At this moment the latter starts its backward movement (see arrow in Fig. 15); the roller 87 will be forced outwardly, but as the gauge prevents the nose 98 from being moved inwardly it will be seen that the balance-beam 83 will swing around 84; through the agency of the sliding blocks 82, cams 78 and knobs 77' and 81 as described, the four rods 72 will be lowered as a whole together with the hopper 48 and counter-pattern, the latter being placed exactly upon the mould below, the amplitude of such downward movement being calculated to this end and the slot 88 and spring 91 securing a certain freedom so as to always secure a perfect rest of the counter-pattern on the mould. Upon swinging the balance beam has also acted by means of its pin 101 on the shaft 103 which upon its longitudinal movement has brought the piece 105 into the plane of the lugs 100. As soon as the hopper 48 has been lowered, the lugs 100 will successively engage the piece 105 which owing to the staggered relation of said lugs in respect of the shaft 103 will receive a reciprocating rocking movement transmitted to 103 and the connecting-rods 107, whereby the hopper 48 will be reciprocated above the counter-pattern; such movement will secure a perfect distribution of the colour previously supplied to 48. At the end of the backward movement of the table 96 the parts will again be in the positions shown in Fig. 15; at this moment the two tables will be moved simultaneously in clockwise direction; the nose 98 will be disengaged, the spring 113 will act (the hopper 48 has been raised automatically at the end of the backward movement of 96 by the balance-weights 112) and through the agency of the rod 89 cause the arm 86 to swing around 85 so as to move the roller 87 to the periphery of 96.

After the mould considered has received all its colours, it is to be charged with material to be compressed, which is effected by means of delivering devices similar to those described, with or without counter-pattern. Previously upon leaving the last colour delivering device, the pattern should be withdrawn from the mould. To this end, as already described, the frame 23 is automatically brought back to the horizontal position by the action of the springs 36', acting at the end of the rails 39 after said last delivering device. At the next stopping of the table VII the mould considered is positioned (Fig. 17) above an incline 116 on a sliding block 117 at the bottom part of the machine, said sliding block being connected by links 118 to a lower arm 119 of a vertical shaft 120 provided with an upper arm 121. Pivotally connected to the latter is a long rod 122, pivotally connected to the arm 123 fast on the square shaft 124 rocked by the action of the press of the machine. The incline 116 is normally located below the roller 125 on the end of a bar 126 swinging in one direction only and guided in guide-ways on the machine frame below the pedestal of the mould.

Upon the backward movement of the table 96 the square shaft 124 will be rocked so as to move the sliding block 117 in the direction of the arrow, whereby the bar 126 will be raised together with the pedestal of the mould; the latter will raise the posts and through the agency of the upper mould plate press the pattern or design against the frame 23 at the same time causing the locking bolts of said frame to operate, whereby the design will be locked in said frame as already described.

It should be noted that the bar 126 (and the guide thereof) is adapted to swing in the direction of the arrow only in order to allow the backward movement of the incline. As soon as the movement of the table VII is started, the frame 23 will be turned down upon the side of the mould, as already described, and said frame 23 will not be raised before the article has been removed from the mould by a mechanism hereinafter described.

Figure 26:
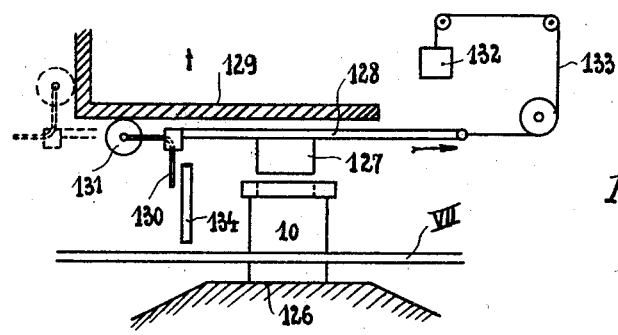
Fig. 26 is a diagram of the slab or tile compressing mechanism.

The mould being completely filled, it will be brought to the pressure mechanism. The latter is constituted by the big press arranged radially with relation to the machine in such a way that the free upper end 126' of the piston thereof will be exactly below the pedestal 10 of the mould. As shown in Fig. 26, the piston 126' ends into a head having a main flat portion between two inclines.

In the position shown in Fig. 26, in which the piston 126' is about to be raised for compressing the slab or tile, the openings of the mould are exactly below a buffer 127 carried by a slide 128, guided along a fixed horizontal ceiling 129. At the front said slide carries the pivot pin of a bell crank lever 130, one arm of which has a roller 131 running along said ceiling. 132 is a balance weight acting to move the buffer in the direction of the arrow, 133 being a cable. 134 is an adjustable post, pivotally arranged on a vertical axle and actuated by the mould.

After the compression has been completed and upon starting the clockwise movement of the table VII, the buffer engaging the mould will be moved together with the latter; the pedestal 10 will slide on the head of the piston 126' and when reaching the incline 135 progressively move downwardly, disengaging the buffer 127 progressively; however the action of the balance-weight 132 is interfered by the post 134 which, displaced by the mould, has engaged the free end of the lever 130, finally causing same to swing (dotted position) at the moment the pedestal 10 being lowered to its normal position, the mould is lower than the bar 126. Immediately the balance weight will act and bring the buffer and bar 126 back to their initial positions above the next mould moved into the position of the mould considered.

The removal of the compressed article takes place immediately after compression and the mechanism effecting same is combined with the mechanism which after the removal replaces into the mould the pattern carried by the pivotal carrier.

Mounted below the rocking table behind the press is a rotary horizontal disc 200 (Figs. 18 to 20) adapted to rotate around the axle 201 under the action of an eccentric disc 202 and bar 203 actuated by the rotary shaft 204, rotated upon the backward movement of the upper table by intermediate parts not shown but easily conceivable. The disc 200 extends at the same time below two moulds, that below the mould just submitted to the action of the press and the mould from which the article has just been removed. Said disc 200 has two similar diametrically opposite inclines 205, acting simultaneously on two blocks 206, 206' provided with rollers 207. The block 206 acts on the posts of the mould to be emptied and the block 206' on the posts of the emptied mould. Said blocks are connected together by an upper cross-bar 208 engageable in certain circumstances by a bevelled locking bolt 209 freely supported on a bracket 210 of the machine frame. Arranged adjacent the bevelled end in said locking bolt is a slot 211 through which an arm 212 extends, said arm having a balance weight 213 and being pivoted at 214 on a bracket of the machine frame. Moreover the locking bolt has a knob 215, engaging a slot 215' in a rod 216 pivoted at 217. Adjacent the incline actuating the block 206 the disc 200 has a peripherical lug 218 adapted to engage the roller 219 on a two-armed lever 220 fulcrumed at 221. The other end of said lever is pivotally connected to the end of a rod 222, pivotally connected to a balance beam 223 pivoted at 224. The free end of the balance beam is connected to a long horizontal plate 225 guided parallel to itself and movable on rotary rollers 226. Said plate serves to convey the slabs or tiles removed from the moulds; it extends normally to a point a little above the top of the pedestal of the mould. Between its pivot-pin and pivotal connection to the plate the balance beam carries a short pivoted lever 227, the free end of which is connected to a curved bar 228 ending into a long hook 229 and made integral with a T-shaped piece 230 the head of which is urged by springs 231 in the direction of the arrow. 232 is a fixed horizontal plane on which the T-shaped piece is adapted to slide. 233 is a spring urging the bell-crank lever 220.

The disc 200 rotating and raising the two blocks 206, 206', the posts together with the plate of the mould to be emptied are raised by the block 206. The pedestal remaining in place; the compressed slab or tile is raised with the plate, whereby a free space will be produced below said slab above the pedestal, the plate 225 being inserted into said space for the reception of the slab. The latter will be disengaged by a fixed buffer (not shown), the slab engaging said buffer upon its upward movement. As soon as the blocks 206, 206' are raised, the locking bolt 209, which was pressed by the balance-weight 213 against the cross-bar 208, will slide below the latter and hold the blocks in raised position in spite of the progressive forward movement of the inclines 205, for the purpose of enabling the plate 225 to be inserted below the slab or tile for the reception of same. The movement of the plate 225 will be easily understood: the lug 218 of the disc 200 causes the two-armed lever 220 to swing and through 222 the balance beam 223 also. Upon its swinging movement the balance beam causes the plate 225 to be moved parallel to itself in the direction of the arrow. The hook 229 will be moved in the same direction and owing to the resistance of the springs 231 combined with the plane 232 upon which the piece 230 is caused to climb and then to slide, said hook will make a nose dive and engage the end of the bar 216; if by the action of the spring 233 acting suddenly as the lug 218 has been moved beyond the roller 219, the parts come back to their inoperative positions, said hook will disengage the locking bolt 209 and consequently the cross-bar 208, the blocks 206, 206' being lowered by swinging around their axles. The plate 225 supporting the slab or slabs may if desired transmit same to an endless conveyer (not shown).

The block 206' will raise the posts of mould preceding that on which the block 206 has acted; owing to the interruption of the rails 39 the pattern carrier of said mould has been brought back to its raised position, so that the mould plate upon its raising will engage said pattern-carrier to receive the pattern. The latter will be automatically disengaged as follows: (Fig. 21) the block 206' has a lug 234 engaging the end of a two-armed lever 235 pivoted at 236 and the other end of which is pivotally connected to a lever 235', in turn pivotally connected to the end of another lever 237 pivoted at 238 and ending into a hook 239. The lever 237 is connected by a link 240 to a long lever 241 extending radially above the mould. The lever 241 is pivoted at 242 and connected by a link 243 to a two-armed lever 244 similar to 237 and similarly ending into a hook 239'. 245 is a balance-weight. The movements are indicated by arrows. The parts are arranged in such a way that the hook will be normally located below the parts previously termed "triggers" in the description of the mould; therefore the movement of the block 206' will determine the operation of both triggers of the mould considered, whereby the pattern will be caused to drop into the plate of the mould. Thus the mould will again be in the initial state and ready for the reception of colours and manufacture of another slab or tile.

The moulds will be automatically cleaned without consumption of motive power by means of bellows (not shown) acting by the rocking shaft of the various raising blocks upon the return movement of the latter. The fixed buffers effecting the removal of the compressed articles from the moulds are to this end coated with Dutch metal or foil.

The various movements of the machine having thus been disclosed, we will proceed to describe the operating devices. Said devices are all connected together and assumed in the example to be actuated by fluid under pressure (compressed air, water and the like); but it will be obvious that any other source of energy may be used.

As already stated the operating device comprises (Figs. 1 and 2) a big press III for compressing the slabs or tiles and a small press I exactly positioned at the centre of the machine. These two presses are connected to each other by means of a big balance-beam 252 pivoted at 253. Said balance-beam rests on journals carried by the piston of the big press, whilst it is connected by means of links 254 to journals 255 on the piston of the small press. The two presses operate alternately and the pivot-pin 253 is arranged between the two presses. At one end the balance-beam has a journal 256 guided in vertical slot 257 in the machine frame. Mounted on said journal is a lever 258 pivotally connected to an arm 259 integral with a sleeve 260 fast on a horizontal square shaft 124. At both ends the shaft 124 has a vertical arm 123 pivotally connected to horizontal levers 122 located substantially in the plane of the lower table. The levers 122 are each pivotally connected to a diametrical girder 264, adapted to turn around the vertical axle 265 carried by the frame of the small press. Said girder is connected by means of uprights to another parallel girder 267 both ends of which are secured to the upper table. It will be seen that the swinging movement of the balance beam 252 will determine the rocking movement of the upper table. The inner periphery of the lower table has notches 270 the number of which is equal to the number of moulds, and each end of the girder 264 carries the pivot-pin of a pawl 271, the tail or extension of which is urged by a spring 258 in a direction to cause the nose 269 to engage a notch 270. Upon the operation of the small press, the girders 264 and 267 will be moved clockwise, each of the pawls engaging a notch in the lower table, whereby both tables will be rotated in unison; if the small press has reached the end of its stroke, a locking bolt will be released and lock the lower table; the piston of the small press being lowered, the two girders 264, 267 will be rotated backwardly, the pawls owing to their beveled noses will be disengaged from the notches and slide along the lower table until at the end of the rotation they will automatically engage another notch. During this return movement the lower table remains in place, the upper table rotating backwardly as described for the delivery of colours.

One of the horizontal levers 122 has already been described for operating the removal of the pattern from the mould after the delivery of colours.

Figure 22:
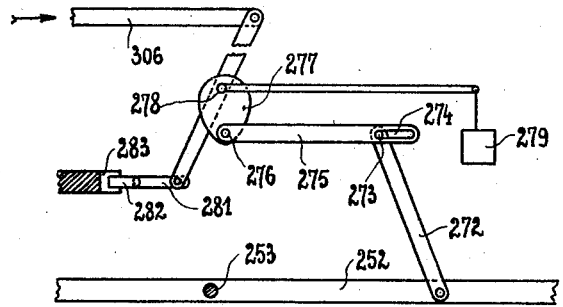
Fig. 22 shows the locking mechanism of the lower table.

The locking of the lower table is effected by the mechanism shown in Fig. 22. Between the pivot pin of the balance-beam 252 and the small press said balance beam has a pivoted arm 272 ending into a knob 273 engaging a slot 274 in a lever 275 pivotally connected to the knob 276 of a cam 277. The latter is fast on the axle 278 urged by a balance weight 279 and carrying a long lever 280 pivotally connected at the bottom to a lever 281 guided horizontally and carrying the locking bolt 282, the point of which is beveled at one edge. The lower table has a number of notches 283 equal to the number of moulds; said notches are provided with adjustable jaws. Owing to its bevelled point the locking bolt is adapted to easily engage said notches and immediately stop the table.

If in the locking position shown in the drawings, the big press operates, the balance-beam 252 upon swinging causes the knob 273 to slide in the slot 274; at the end of the stroke the arm 272 will horizontally pull the lever 275 whereby the locking bolt will be disengaged. The engagement thereof will be effected by the small press as soon as the knob 273 has completed its sliding movement in the slot and acts on the locking bolt in the direction of the balance-weight.

The movement of said locking bolt will release the admission of fluid compressed in the big press, or in other words operate the distribution of fluid. For the disclosure of the latter it will be noted that the compression of the slabs or tiles is effected in three steps: compression to 50 kgs; drop of pressure or airing, (to permit the escape of air contained in the slabs), and compression to 200 kilogrs.

Figure 23:
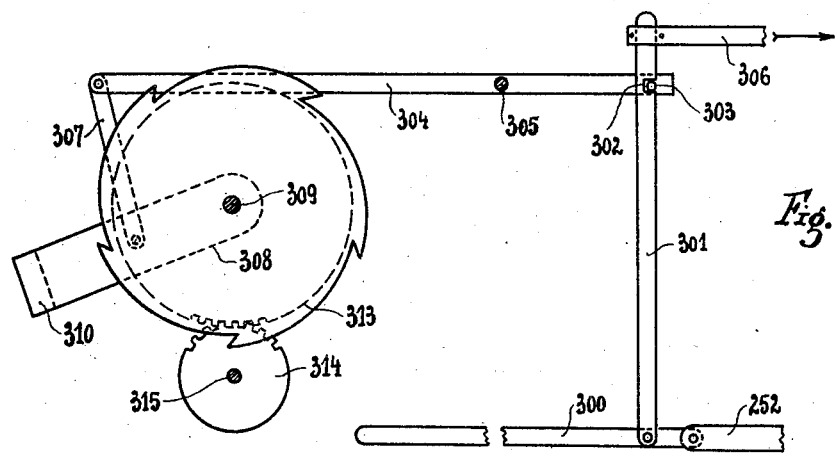
Figs. 23 to 25 show details of the delivering mechanism or the operating device of the big press.
Figure 24:
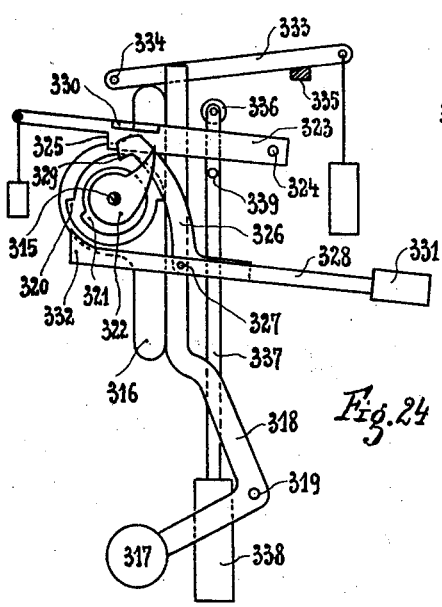
Figure 25:
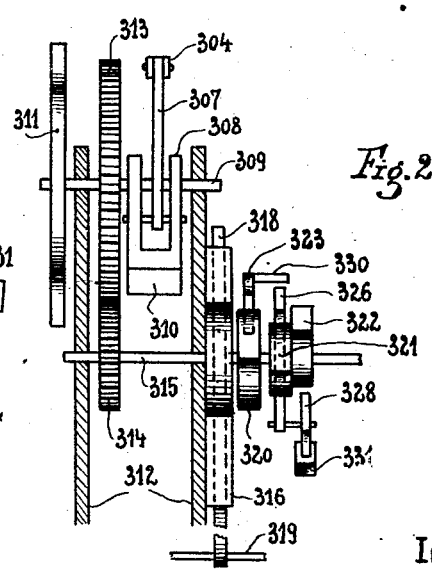

Pivotally connected to a rigid or pivoted extension 300 (Fig. 23 and following) of the balance-beam 252 beyond the big press and outside the lower table is a vertical lever 301 provided near its upper end with a notch 302 engaged—so long as the locking bolt does not engage the table—by the journal 303 on the end of a lever 304 pivoted at 305. The end of the lever 301 is connected by means of a pivot-pin, slot or the like to a lever 306 pivotally connected to the upper end of the lever 280 (Fig. 22). The lever 304 is connected by means of a link 307 to a lever 308 fast on a horizontal shaft 309 and ending into a balance weight 310. Keyed on the shaft 309 (supported in fixed uprights 312) is a fly-wheel 311 and a large toothed wheel 313, the parts being mounted in such a way that the balance weight 310 will have tendency to rotate the toothed wheel 313 in counter-clockwise direction. Said toothed wheel meshes with another smaller wheel 314 on a shaft 315 of which is keyed a cam 316 of the shape shown in Fig. 24. Normally applied against the straight part of said cam by the action of the balance weight 317 is a bell crank lever 318 fast on the shaft 319, which is the starting shaft of the distribution. Keyed on the shaft 315 are other cams 320, 321 and 322 of different shapes, mounted as shown in Fig. 24.

Mounted in the plane of the cam 320 is a lever 323 pivoted at 324 and normally applied upon said cam by the action of a weight of 50 kilo. suspended therefrom.

Mounted in the plane of the cam 321 is a bell-crank lever 326 fast on the pivot-pin 327 of another lever 328; the lever 326 has an arm 329 adapted to be engaged by the nose of the cam 321 and also located in the plane of a lug 330 on the lever 323. The lever 328 is in the plane of the cam 322 and ends on one hand into a nose 332 and on the other hand into a balance weight 331.

333 is a lever pivoted at 334 and charged with a weight of 150 kilogrs.; normally said lever is supported on a lug 335 located in the plane of a roller 336 carried on the end of a rod 337 forming the rod of the piston in the cylinder 338. The latter is connected to the fluid distributor and serves to adjust the pressure of such fluid towards the big press; the rod 337 moreover has a lug 339 located in the plane of lever 323.

If at the end of the upward movement of small press the locking bolt 282 is engaged, the bar 306 will be pulled in the direction of the arrow (Fig. 22) and disengage the journal 303 from the notch 302. Now the balance weight 310 may operate and it first causes the gear-wheel 313 and shaft 315 to rotate. The cam 316 will push the lever 218 whereby the distribution will be operated. Pressure will be produced below the piston the big press and such pressure will be progressively increased upon the rotation of the shaft 315, the cam 316 of which will progressively open the distribution; after a certain lapse of time the nose of the cam 320 will engage the nose of the lever 323 and the shaft 315 will be stopped until, the pressure in the big press being of 50 kilogrs., the rod 337 will raise the lever 323 by its lug 339. At this moment the slab or tile is compressed to 50 kilogrs.; the balance weight 310 will again be moved and the shaft 315 rotated.

The concentric part of the cam 316 will now be engaged by the lever 318, whereby the pressure will drop and the lever 323 together with the rod 337 will be lowered. But at the same time the cam 322 upon rotation has acted on lever 328 which upon swinging has lowered lever 326. The latter has been lowered below the lug 330 on lever 323 and at the moment the cam 322 is disengaged from 328, the cam 321 by its nose will engage the nose of the lever 326, causing the latter (with the assistance of the balance weight 331) to be raised again together with the lever 323. At this moment the rod 337 does no longer be submitted to the action of the lever 323; the shaft 315 upon continued rotation causes the cam 316 to be engaged by the lever 318 on its largest eccentricity, whereby the distribution will be opened to a maximum and the rod 337 raised together with the levers 323 and 333, which will correspond to a compression of 200 kilogrs. As soon as the shaft 315 has exactly completed a revolution (determined by the ratio of the gear-wheels 313 and 314 and the initial position of the lever 308) the various cams and levers have been moved back to their initial positions. The lever 301 progressively raised by the big press, has again placed its notch in front of the journal 303; the locking bolt has been disengaged so that the journal 303 by the movement of the bar 306 will again engage its notch; upon the lowering of the big piston, the balance weight 310 will be raised whereby the mechanism will be ready for another compression. Of course, a clutch (not shown) must be provided for enabling the balance weight 310 to be raised without influencing the various cams of the distribution.

Figure 27:
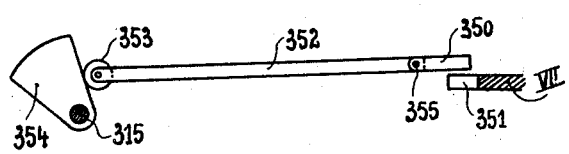
Figs. 27 to 29 are views of the various safety mechanisms.

From the foregoing it will be seen that it is important that the movement of the lower table will always take place exactly according to the same amplitude and that during the action of the gib press said table will be held perfectly fixed. The invention, besides the big internal locking bolt shown in Fig. 22, provides another safety bolt 350 (Fig. 27) adapted to engage one of the notches 351 in the outer face of the lower table. Said locking bolt 350 is integral with a lever 352 pivoted at 355 and provided with a roller 353 engaged by a cam or segment 354. Said cam is fast on the shaft 315 and shaped in such a way that, during nearly all the time of a revolution of the shaft 315 the locking bolt will engage its notch into which it is inserted from the top.

Figure 28:
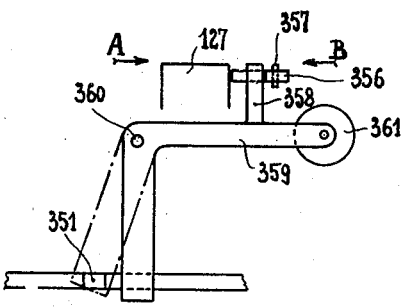

On the other hand said locking bolt constitutes a safety member locking the big press (that is the distribution controlling device), should the pressure buffer-carrier (Fig. 26) not be moved back exactly to its position for compression. To this end we have mounted at the right (Fig. 28) of the buffer-carrier 127 (that is in the path of said buffer-carrier when moved by the action of the balance weight 132) a horizontal lever 356 pivoted on 357 and the lower end of which engages the lug 358 on a lever 359 pivoted at 360 and supporting a balance-weight 361. The free end of lever 359 is adapted to be moved in front of the notch 351 in the table VII. If, after compression, the buffer-carrier 127 returns in the direction of the arrow A by the action of the balance-weight 132, it will engage the tail of lever 356 which swinging in the direction B will engage the lug 358 and move the lever 359 to the dotted position as soon as the buffer-carrier will be in the desired position. Should the movement of the buffer-carrier be insufficient, the notch 351 will be closed by the lever 359 whereby the outer locking bolt 350 will be prevented from engaging same and therefore the shaft 315 will be prevented from rotating, consequently the big press cannot operate.

Fig. 2 shows the diagram of a safety acting on the lever 318 fast on the distribution shaft. Said safety serves to prevent the table from rotating so long as the colour delivering hoppers have not completed their functions and started their upward movements together with the counter-pattern, in order to avoid the breakage of parts, should the cam 316 after the compression of slabs, be moved back to the admission of the small press and the table start its movement.

Figure 29:
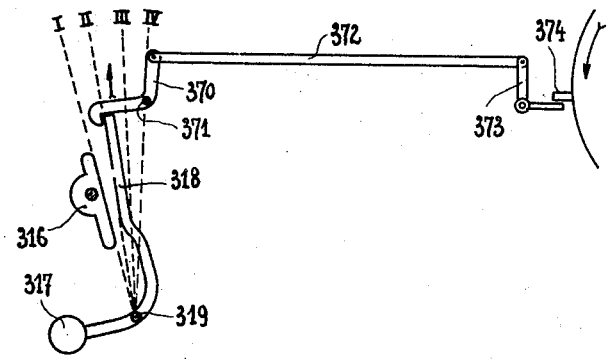

In Fig. 29, I, II, III, IV designate the four positions of the lever 318, the position I corresponding to the admission to the small press (rotation of the table and lowering of the big press), the position II to the drop of pressure, the position III to the compression to 50 kilogs. and the position IV to the compression to 200 kilogs. by the big press. As previously described a wheel of the cam 316 will determine the following four successive positions: position I, admission to the small press for the rotation of the table; stopping of the table; position III, compression to 50 kilogs. of the slabs; position II, drop of pressure, then position IV, pressure of 200 kilogs. on the slabs. Upon the return of lever 318 from IV to I, if the colour delivering hoppers have not completed their movements, the lever 318 must be momentarily prevented from coming back to the position I; to this end said lever will be locked for the desired time in the position II (drop of pressure); said lever will be engaged upon its movement from the position II to the position I by the nose of a lever 370 pivoted at 371 and connected to a connecting-rod 372. The latter is pivotally connected to a short pivoted bell-crank lever 373 the free end of which is engaged by a lug 374 on the upper table substantially at the end of the return movement of said table. Said lug 374 causes the hook on lever 370 to swing in the direction indicated, whereby the lever 318 will be released and enabled to suddenly open the distribution required for rotating the table (return to the position I).

The locking mechanism of Fig. 29 may also operate upon the movement from the position I to the positions III and IV, but only if the table or the buffers are not in the required positions.

I wish it to be understood that adjusting means may be provided in the various mechanisms described and lubricating devices at the desired places. The invention is not limited to the embodiments shown and described as examples only; modifications and changes may be made in the construction without departing from the scope of the invention defined by the appended claims.

Having now fully described my said invention, what I claim and desire to secure by Letters Patent, is:

1. In a circular machine for making conglomerated slabs or tiles with or without colored designs, the combination with a circular machine frame, of a circular lower table adapted to run on said frame, a number of moulds supported by said lower table and uniformly distributed thereon, a circular upper table supported on said frame, operating devices causing said tables to be rotated in unison in one direction through an angle equal to that corresponding to the segment comprised between two successive moulds and locking the lower table after such rotation, at the same time rotating the upper table backwardly to its initial position, a pressure mechanism acting on a single mould upon the stopping of the lower table, colour delivering mechanisms placed according to the moulds and supported on the machine frame, said delivering devices upon the stopping of the lower table delivering one colour according to a given design to the mould moved below them, a mechanism for removing the finished articles from the moulds, and a mechanism for operating the pressure mechanism, the movement of which is started by the stopping of the lower table, substantially as set forth.

2. In a circular machine for making conglomerated slabs or tiles with or without colored designs, the combination with the machine frame, of a lower circular table and an upper circular table adapted to be rotated on said frame, a number of moulds supported on said lower table, each mould formed of a box secured to said table, a pedestal guided in said box, two vertical posts slidable through said box, a mould body supported on said posts above the pedestal, means for raising the pedestal together with the mould body, and means for raising the mould body independently from the pedestal, substantially as set forth.

3. In a circular machine for making conglomerated slabs or tiles with or without colored designs, the combination with the machine frame, of a lower circular table and an upper circular table adapted to be rotated on said frame, a number of moulds supported on said lower table, each mould formed of a box secured to said table, a pedestal guided in said box, two vertical posts slidable through said box, a mould body supported on said posts above the pedestal, means for raising the pedestal together with the mould body, and means for raising the mould body independently from the pedestal, a pressure mechanism comprising a fluid press, a piston in said press adapted to raise said pedestal and vertical posts, and a fixed buffer above the mould against which the articles are compressed upon the raising of said piston, substantially as set forth.

4. In a circular machine for making conglomerated slabs or tiles with or without colored designs, the combination with the machine frame, of a lower circular table and an upper circular table adapted to be rotated on said frame, a number of moulds supported on said lower table, each mould formed of a box secured to said table, a pedestal guided in said box, two vertical posts slidable through said box, a mould body supported on said posts above the pedestal, means for raising the pedestal together with the mould body, and means for raising the mould body independently from the pedestal, a metallic pattern in the mould for the distribution of the colours in said mould, means for removing said pattern from the mould upon the filling of same and the raising of the pedestal, a pivoted frame connected to the mould, yielding pattern retaining means on said frame against which said pattern is applied upon the raising of the pedestal substantially as set forth.

5. In a circular machine for making conglomerated slabs or tiles with or without colored designs, the combination with the machine frame, of a lower circular table and an upper circular table adapted to be rotated on said frame, a number of moulds supported on said lower table, each mould formed of a box secured to said table, a pedestal guided in said box, two vertical posts slidable through said box, a mould body supported on said posts above the pedestal, means for raising the pedestal together with the mould body, and means for raising the mould body independently from the pedestal, a metallic pattern in the mould for the distribution of the colours in said mould, means for removing said pattern from the mould upon the filling of same and the raising of the pedestal, a pivoted frame connected to the mould, yielding pattern retaining means on said frame against which said pattern is applied upon the raising of the pedestal, means for normally holding said frame turned down behind the mould upon the lower table, substantially as set forth.

6. In a circular machine for making conglomerated slabs or tiles with or without colored designs, the combination with the machine frame, of a lower circular table and an upper circular table adapted to be rotated on said frame, a number of moulds supported on said lower table, each mould formed of a box secured to said table, a pedestal guided in said box, two vertical posts slidable through said box, a mould body supported on said posts above the pedestal, means for raising the pedestal together with the mould body, and means for raising the mould body independently from the pedestal, a metallic pattern in the mould for the distribution of the colours in said mould, means for removing said pattern from the mould upon the filling of same and the raising of the pedestal, a pivoted frame connected to the mould, yielding pattern retaining means on said frame against which said pattern is applied upon the raising of the pedestal, rollers carried by said frame, guide-rails for said rollers above the lower table for holding said frame normally turned down behind the mould upon said table, and springs for automatically raising said frame at certain points of said rails, substantially as set forth.

7. In a circular machine for making conglomerated slabs or tiles with or without colored designs, the combination with the machine frame, of a lower circular table and an upper circular table adapted to be rotated on said frame, a number of moulds supported on said lower table, each mould formed of a box secured to said table, a pedestal guided in said box, two vertical posts slidable through said box, a mould body supported on said posts above the pedestal, means for raising the pedestal together with the mould body, and means for raising the mould body independently from the pedestal, a metallic pattern in the mould for the distribution of the colours in said mould, means for removing said pattern from the mould upon the filling of same and the raising of the pedestal, a pivoted frame connected to the mould, yielding pattern retaining means on said frame against which said pattern is applied upon the raising of the pedestal, a pusher bar mounted below the lower table and adapted to raise said pedestal, said pusher bar being actuated by the fluid press upon the return movement of the upper table, substantially as set forth.

8. In a circular machine for making conglomerated slabs or tiles with or without colored designs, the combination with the machine frame, a circular lower table and a circular upper table on said frame, means for rotating said tables in unison in one direction and means for rotating the upper table backwardly and at the same time stopping the lower table, of a number of moulds uniformly arranged on the lower table, a pattern in each mould, colour delivering devices for said moulds each of which comprises a colour reservoir, a hopper receiving colour from said reservoir in desired amounts, a counter-pattern, means for controlling the admission of colour into said hopper, means for controlling the simultaneous lowering of the counter-pattern and hopper upon the pattern in the mould, means for reciprocating said hopper on the counter-pattern, means for raising the counter-pattern and hopper, means arranged on the machine frame, lower table and upper table whereby the admission of colour into the hopper is controlled by the lower table at the end of its movement, whilst the other movements are controlled by the return movement of the upper table, and connections between the various controlling means, substantially as set forth.

9. In a circular machine for making conglomerated slabs or tiles with or without colored designs, the combination with the machine frame, a circular lower table and a circular upper table on said frame, means for rotating said tables in unison in one direction and means for rotating the upper table backwardly and at the same time stopping the lower table, of a number of moulds uniformly arranged on the lower table, a pattern in each mould, stationary colour delivering devices for said moulds, a series of gauges in front of each mould on the lower table, each of said gauges corresponding to a colour delivering device, means for adjusting said gauges so as to cause them to control the desired delivering devices as they are moved below the same, substantially as set forth.

10. In a circular machine for making conglomerated slabs or tiles with or without colored designs, the combination with the machine frame, a circular lower table and a circular upper table on said frame, means for rotating said tables in unison in one direction and means for rotating the upper table backwardly and at the same time stopping the lower table, of a number of moulds uniformly arranged on the lower table, a pattern in each mould, colour delivering devices for said moulds each of which comprises a colour reservoir, a hopper, a counter-pattern, and a counter-pattern operating mechanism, a series of gauges in front of each mould on the lower table, each of said gauges corresponding to a colour delivering device, means for adjusting said gauges so as to cause them to control the desired delivering devices as they are moved below the same, three adjustable noses on the machine frame at places corresponding to the colour delivering devices, said noses being adapted to be engaged successively by the gauges on the lower table, a colour delivering slide at the bottom of the colour reservoir, the first nose on the machine frame controlling the opening of said slide, the second nose moving said slide back to its normal position, and the third nose, upon the stopping of the lower table, making the hopper and counter-pattern operating mechanism ready for operation, substantially as set forth.

11. In a circular machine for making conglomerated slabs or tiles with or without colored designs, the combination with the machine frame, a circular lower table and a circular upper table on said frame, means for rotating said tables in unison in one direction and means for rotating the upper table backwardly and at the same time stopping the lower table, of a number of moulds uniformly arranged on the lower table, a pattern in each mould, color delivering devices for said moulds each of which comprises a colour reservoir, a hopper, a counter-pattern and a counter-pattern operating mechanism comprising a horizontal frame carrying said counter-pattern, horizontal slots in said frame, journals at the bottom part of the hopper engaging said slots, vertical rods from which said frame is suspended, two horizontal rods to which said vertical rods are connected in pairs, two diametrically opposite cams having knobs moving said horizontal rods vertically, a balance-beam actuated by the upper table and rotating said cams in opposite directions, substantially as set forth.

12. In a circular machine for making conglomerated slabs or tiles with or without colored designs, the combination with the machine frame, a circular lower table and a circular upper table on said frame, means for rotating said tables in unison in one direction and means for rotating the upper table backwardly and at the same time stopping the lower table, of a number of moulds uniformly arranged on the lower table, a pattern in each mould, colour delivering devices for said moulds each of which comprises a colour reservoir, a hopper, a counter-pattern, a series of gauges in front of each mould on the lower table to control the desired delivering devices as they are moved below the same, three adjustable noses on the machine frame adapted to be engaged successively by the gauges on the lower table, a horizontal frame carrying said counter-pattern, horizontal slots in said frame, journals at the bottom part of the hopper engaging said slots, vertical rods from which said frame is suspended, two horizontal rods to which said vertical rods are connected in pairs, two diametrically opposite cams having knobs moving said horizontal rods vertically, a balance-beam actuated by the upper table and rotating said cams in opposite directions, a long lever, connected to said balance-beam and one end of which is held in fixed position upon the stopping of the lower table by a gauge engaging the third nose on the machine frame, the other end of said lever being urged by the circular part of the upper table for swinging the balance-beam, substantially as set forth.

13. In a circular machine for making conglomerated slabs or tiles with or without colored designs, the combination with the machine frame, a circular lower table and a circular upper table on said frame, means for rotating said tables in unison in one direction and means for rotating the upper table backwardly and at the same time stopping the lower table, of a number of moulds uniformly arranged on the lower table, a pattern in each mould, colour delivering devices for said moulds each of which comprises a colour reservoir, a hopper, a counter-pattern, a series of gauges in front of each mould on the lower table to control the desired delivering devices as they are moved below the same, a colour delivering slide at the bottom of the colour reservoir, a horizontal frame carrying said counter-pattern, horizontal slots in said frame, journals at the bottom part of the hopper engaging said slots, vertical rods from which said frame is suspended, two horizontal rods to which said vertical rods are connected in pairs, two diametrically opposite cams having knobs moving said horizontal rods vertically, a balance-beam actuated by the upper table and rotating said cams in opposite directions, a transverse shaft, a connecting-rod and crank connection between the journals on the hopper and said transverse shaft, an anchor-shaped piece at the end of the latter, lugs arranged in staggered relation on the upper table with relation to the axis of said piece and engaging same for rocking the transverse shaft, substantially as set forth.

14. In a circular machine for making conglomerated slabs or tiles with or without colored designs, the combination with the machine frame, a circular lower table and a circular upper table on said frame, means for rotating said tables in unison in one direction and means for rotating the upper table backwardly and at the same time stopping the lower table, of a number of moulds uniformly arranged on the lower table, a pattern in each mould, colour delivering devices for said moulds each of which comprises a colour reservoir, a hopper, a counter-pattern, a series of gauges in front of each mould on the lower table to control the desired delivering devices as they are moved below the same, a colour delivering slide at the bottom of the colour reservoir, a horizontal frame carrying said counter-pattern, horizontal slots in said frame, journals at the bottom part of the hopper engaging said slots, vertical rods from which said frame is suspended, two horizontal rods to which said vertical rods are connected in pairs, two diametrically opposite cams having knobs moving said horizontal rods vertically, a balance-beam actuated by the upper table and rotating said cams in opposite directions, a transverse shaft, a connecting-rod and crank connection between the journals on the hopper and said transverse shaft, an anchor-shaped piece at the end of the latter, lugs arranged in staggered relation on the upper table with relation to the axis of said piece and engaging same for rocking the transverse shaft, a spring acting on said lever for automatically raising the hopper and counter-pattern at the end of the return movement of the upper table, a notch in the circular part of the latter adapted to be engaged by the end of said lever, substantially as set forth.

15. In a circular machine for making conglomerated slabs or tiles with or without colored designs, the combination with a machine frame, a lower table rotatably mounted on said frame, and an upper table similarly mounted on same, a number of uniformly spaced moulds on the lower table, and colour distributing devices above said moulds, a small central fluid press, a big lateral press, a girder pivoted between the pistons of said presses and connecting said pistons to move them in opposite directions, means between the small press and upper and lower tables whereby the latter are moved forwardly simultaneously, substantially as set forth.

16. In a circular machine for making conglomerated slabs or tiles with or without colored designs, the combination with a machine frame, a lower table rotatably mounted on said frame, and an upper table similarly mounted on same, a number of uniformly spaced moulds on the lower table, and colour distributing devices above said moulds, a small central fluid press, a big lateral press, a girder pivoted between the pistons of said presses and connecting said pistons to move them in opposite directions, means between the small press and upper and lower tables whereby the latter are moved forwardly simultaneously, a notch in the lower table, a locking bolt adapted to engage said notch and controlled by the small press, a balance-weight, the fluid distribution shaft of the big press, connections between said balance-weight and distribution shaft and means whereby said balance-weight is released by the small press to actuate said distribution shaft, substantially as set forth.

17. In a circular machine for making conglomerated slabs or tiles with or without colored designs, the combination with a machine frame, a lower table rotatably mounted on said frame, and an upper table similarly mounted on same, a number of uniformly spaced moulds on the lower table, and colour distributing devices above said moulds, a small central fluid press, a big lateral press, a girder pivoted between the pistons of said presses and connecting said pistons to move them in opposite directions, means between the small press and upper and lower tables whereby the latter are moved forwardly simultaneously, a notch in the lower table, a locking bolt adapted to engage said notch and controlled by the small press, a balance-weight, the fluid distribution shaft of the big press, connections between said balance-weight and distribution shaft and means whereby said balance-weight is released by the small press to actuate said distribution shaft, a cam shaft, connections between the latter and said balance-weight, a first cam on said cam-shaft, a distribution lever actuated directly by said first cam, three other cams on said cam-shaft locking the movement until the pressure will be increased to 50 kilogrs. whereupon the first cam actuates the distribution lever for causing the pressure to drop and then suddenly a pressure increased to 200 kilogrs., substantially as set forth.

18. In a circular machine for making conglomerated slabs or tiles with or without colored designs, the combination with a machine frame, a lower table rotatably mounted on said frame, and an upper table similarly mounted on same, a number of uniformly spaced moulds on the lower table, and colour distributing devices above said moulds, a small central fluid press, a big lateral press, a girder pivoted between the pistons of said presses and connecting said pistons to move them in opposite directions, means between the small press and upper and lower tables whereby the latter are moved forwardly simultaneously, a notch in the lower table, a locking bolt adapted to engage said notch and controlled by the small press, a balance-weight, the fluid distribution shaft of the big press, connections between said balance-weight and distribution shaft and means whereby said balance-weight is released by the small press to actuate said distribution shaft, a cam shaft, connections between the latter and said balance-weight, a first cam on said cam-shaft, a distribution lever actuated directly by said first cam, three other cams on said cam-shaft locking the movement until the pressure will be increased to 50 kilogrs. whereupon the first cam actuates the distribution lever for causing the pressure to drop and then suddenly a pressure increased to 200 kilogrs., two levers one of which is charged with a weight of 50 kilogrs. and the other with a weight of 150 kilogrs. for limiting the pressure, a cylinder branched on the fluid main and a piston in said cylinder for successively raising said levers, substantially as set forth.

19. In a circular machine for making conglomerated slabs or tiles with or without colored designs, the combination with the machine frame, a rotatably mounted table on said frame, and an upper table similarly mounted on same, a number of uniformly spaced moulds on the lower table and colour delivering devices above said moulds, vertical posts carrying the mould body and a fixed buffer above each mould, of a rotary disc below the lower table, an incline on said disc, a lifting block adapted to be raised by said incline for raising the vertical posts of the mould and move the finished slab or tile against the fixed buffer, a reciprocating plate receiving the slab or tile from the mould, a lever connected to said plate, and a lug on the disc engaging said lever for reciprocating the plate, substantially as set forth.

20. In a circular machine for making conglomerated slabs or tiles with or without colored designs, the combination with the machine frame, a rotatably mounted table on said frame, and an upper table similarly mounted on same, a number of uniformly spaced moulds on the lower table and colour delivering devices above said moulds, vertical posts carrying the mould body and a fixed buffer above each mould, of a rotary disc below the lower table, an incline on said disc, a lifting block adapted to be raised by said incline for raising the vertical posts of the mould and move the finished slab or tile against the fixed buffer, a reciprocating plate receiving the slab or tile from the mould, a lever connected to said plate, and a lug on the disc engaging said lever for reciprocating the plate, a member locking said lifting block in its raised position, and means whereby said locking member will be released upon the return movement of the plate charged with a slab or tile, substantially as set forth.

21. In a circular machine for making conglomerated slabs or tiles with or without colored designs, the combination with the machine frame, a rotatably mounted table on said frame, and an upper table similarly mounted on same, a number of uniformly spaced moulds on the lower table and colour delivering devices above said moulds, vertical posts carrying the mould body and a fixed buffer above each mould, of a rotary disc below the lower table, an incline on said disc, a lifting block adapted to be raised by said incline for raising the vertical posts of the mould and move the finished slab or tile against the fixed buffer, a reciprocating plate receiving the slab or tile from the mould, a lever connected to said plate, and a lug on the disc engaging said lever for reciprocating the plate, a second lifting block similarly actuated by said rotary disc and raising the vertical posts of the preceding mould, and means actuated by said second lifting block to place the pattern into the mould for another series of operations, substantially as set forth.

22. In a circular machine for making conglomerated slabs or tiles with or without colored designs, the combination with a machine frame, a lower table rotatably mounted on said frame, and an upper table similarly mounted on same, a number of uniformly spaced moulds on the lower table, and colour distributing devices above said moulds, a small central fluid press, a big lateral press, a girder pivoted between the pistons of said presses and connecting said pistons to move them in opposite directions, means between the small press and upper and lower tables whereby the latter are moved forwardly simultaneously, a notch in the lower table, a locking bolt adapted to engage said notch and controlled by the small press, a balance-weight, the fluid distribution shaft of the big press, connections between said balance-weight and distribution shaft and means whereby said balance-weight is released by the small press to actuate said distribution shaft, a cam-shaft, an auxiliary safety bolt, actuated by the cam-shaft for locking the lower table, substantially as set forth.

23. In a circular machine for making conglomerated slabs or tiles with or without colored designs, the combination with a machine frame, a lower table rotatably mounted on said frame, and an upper table similarly mounted on same, a number of uniformly spaced moulds on the lower table, and colour distributing devices above said moulds, a small central fluid press, a big lateral press, a girder pivoted between the pistons of said presses and connecting said pistons to move them in opposite directions, means between the small press and upper and lower tables whereby the latter are moved forwardly simultaneously, a notch in the lower table, a fluid distribution shaft of the big press, a distribution lever, a lever locking the distribution lever in order to hold the lower table in fixed position until the hoppers will be raised, and a lug on the upper table releasing said locking lever at the end of the return movement of said upper table, substantially as set forth.

24. In a circular machine for making conglomerated slabs or tiles with or without colored designs, the combination with a machine frame, a lower table rotatably mounted on said frame, and an upper table similarly mounted on same, a number of uniformly spaced moulds on the lower table, and colour distributing devices above said moulds, a small central fluid press, a big lateral press, a girder pivoted between the piston of said presses and connecting said pistons to move them in opposite directions, means between the small press and upper and lower tables whereby the latter are moved forwardly simultaneously, a notch in the lower table, a fluid distribution shaft of the big press, a cam shaft, an auxiliary safety bolt, actuated by the cam-shaft for locking the lower table, a flat plane on the piston of the big press, an incline at the end of said plane, the pedestal of the mould being adapted to slide on said incline together with the horizontally guided pressure buffer, a balance-weight for moving said buffer back to its initial position after the pedestal has reached the lower end of said incline, a lever charged with a balance-weight engaged by said buffer upon its return movement and means whereby said lever will enable said auxiliary safety bolt to engage its notch as soon as the buffer has reached its normal position, substantially as set forth.

HENRI DRUART.